INVENTORS
CLEM H. SPITLER AND
FREDERICK C. MOON
BY Dybvig & Dybvig
THEIR ATTORNEYS.

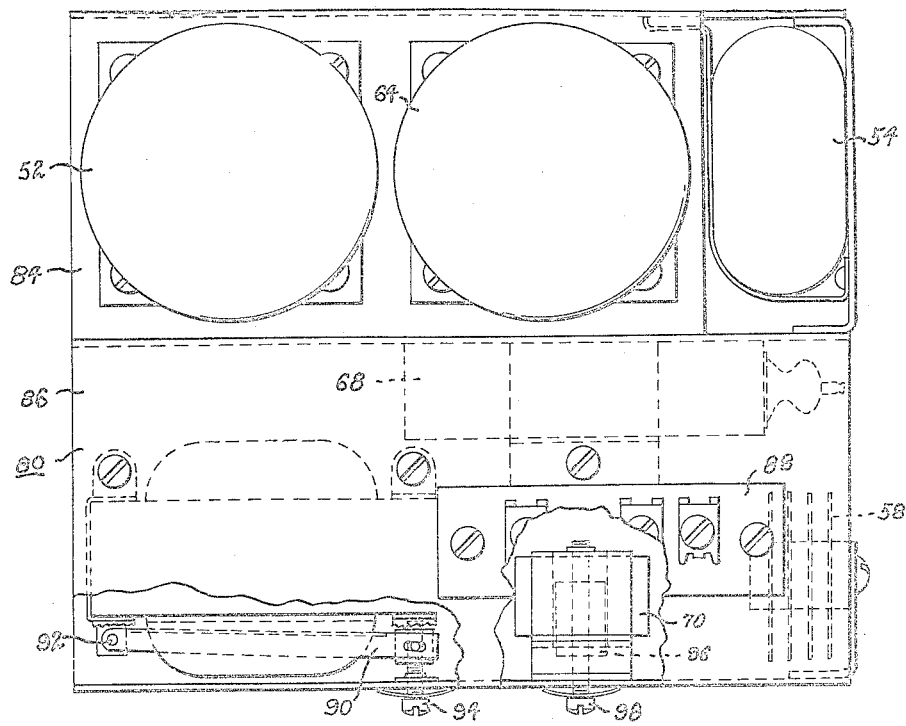

United States Patent Office 2,717,982
Patented Sept. 13, 1955

2,717,982

SPEED CONTROL FOR ALTERNATOR

Clem H. Spitler and Frederick C. Moon, Dayton, Ohio, assignors to Robert E. McNett and Theodore B. Holiday, as trustees for Royal Electric, Inc., Jamestown, Ohio, a corporation of Ohio Application June 28, 1950, Serial No. 170,894

10 Claims. (Cl. 322—16)

This invention relates to control apparatus and more particularly to an improved means for controlling the speed and voltage output of an inverter.

It is an object of this invention to provide an improved control for an inverter wherein a first tuned circuit is provided for controlling the exciter field so as to thereby control the voltage output of the inverter and a second tuned circuit is provided for controlling the shunt field of the motor so as to control the speed of the motor and thereby control the frequency of the alternating current generated by the inverter.

Another object of this invention is to provide a control which is compact and inexpensive but yet reliable and accurate in operation.

More particularly, it is an object of this invention to provide a control having simple and inexpensive means for adjusting for manufacturing variations.

Still another object of this invention is to provide a control for an inverter in which an improved arrangement is provided for stabilizing the speed of the direct current motor when the inverter is first energized so as to prevent the frequency from exceeding the range within which the control is capable of operating.

Another object of this invention is to provide an improved mechanical arrangement of the control elements so as to provide compactness and adjustability.

Other objects and advantages reside in the construction of parts, the combination thereof and the mode of operation, as will become more apparent from the following description.

In the drawings:

Figure 4 is a plan view of the control unit;

Figure 5 is a side elevational view of the control unit showing the accessibility of the means for changing the inductance of portions of the circuit; and Figure 6 is a fragmentary sectional view taken on line 6—6 of Figure 5.

In the preferred embodiment of our invention, the inverter is preferably, though not necessarily, of the type which is adapted to be energized from a direct current source with a potential of approximately 27½ volts. The output of the inverter is single phase, 115 volts, alternating current, having a frequency of 400 cycles. The rated capacity of inverters of this type is approximately 2500 volt amperes.

The inverter is a conventional type which consists of a direct current motor which drives an alternator. The speed of the driving motor determines the frequency of the generated voltage and the voltage output of the alternator is regulated by controlling the field excitation of the alternator.

Generally speaking, a tuned circuit is employed in which a condenser and inductance is paralleled across the alternating current output line through a control coil which regulates the resistance in the shunt field circuit of the driving motor and a similar tuned circuit is employed for regulating the resistance in the exciter field circuit. By so regulating the resistances in these circuits, the frequency and voltage of the inverter can be automatically controlled for any value of load within the rating of the inverter.

Figure 1:
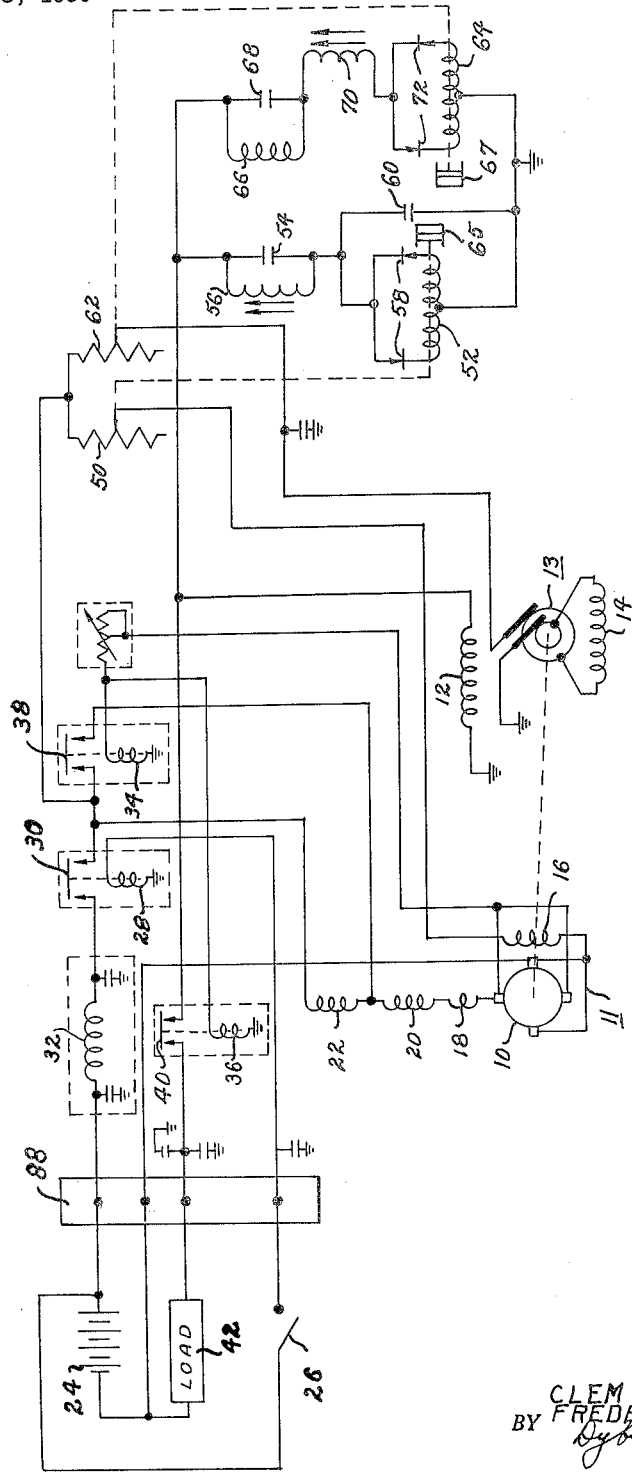
Figure 1 is a schematic circuit diagram showing the control system.
Figure 2:
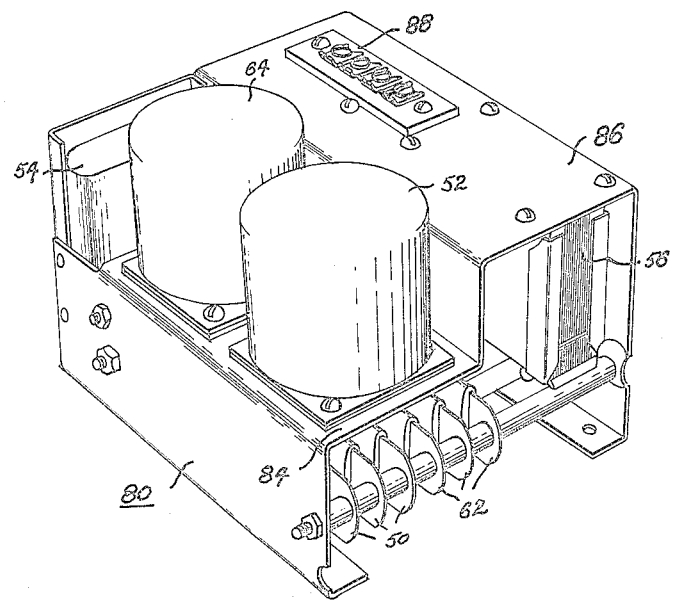
Figure 2 is a perspective view of the control unit.

Referring now to Figure 1 of the drawings wherein the relationship of the controls to the inverter mechanism has been diagrammatically shown, reference numeral 10 designates the armature of the direct current motor 11 which is used for driving an alternator 13 having a stator coil 12 and a rotating exciter field 14. The alternator and the direct current motor may be mounted in a common housing with a single shaft used to support the direct current armature and the exciter field or, if desired, the alternator and the direct current motor may be mounted in separate housings. Since the construction and arrangement of the main inverter parts including the mechanical connection between the alternator and the motor form no part of this invention, the details thereof have not been shown. Such details are well-known to those familiar with inverters.

As shown in Figure 1 of the drawings, the direct current motor is provided with a shunt field 16, a compensating field 18, an inter-pole field 20, and a starting series field 22, which are arranged in circuit as shown. For purposes of illustration, we have shown the direct current motor energized from a storage battery 24, whereas any suitable form of power supply may be used for energizing the motor.

The motor is adapted to be started by closing the control switch 26 which serves to energize the motor starting relay 28. Energization of the motor starting relay 28 closes the switch 30 which serves to connect the various fields 16, 18, 20, and 22 to the power supply through the usual filter 32, so as to cause the motor to be energized. As the motor comes up to speed, the relay coils or solenoids 34 and 36 will be energized, so as to close the switches 38 and 40 respectively. Closing of the switch 38 in effect short-circuits the starting series field 22. Closing of the switch 40 serves to connect the alternating current load 42 to the output of the alternator portion of the inverter.

In order to control the amount of current flowing through the shunt field of the direct current motor so as to control the speed of the motor and consequently the frequency of the current generated by the alternator, a variable resistance 50 has been provided in the shunt field circuit as shown. The variable resistance 50 is controlled by the solenoid coil 52 forming a part of a tuned circuit which includes a condenser 54 and an inductance 56 paralled across the alternating current output line through the control coil 52.

In order to compensate for manufacturing variations, the inductance 56 includes means for varying the amount of iron in the flux path, as will be explained more fully in connection with the description of the construction shown in Figures 2 through 6. It will be noted that a rectifier 58 has been provided between the alternating current supply and the solenoid coil 52. This rectifier makes it possible to use non-laminated iron in the magnetic circuit of the control and improves the efficiency of operation of the solenoid 52.

A condenser 60 has been connected in the circuit as shown, so as to stabilize the speed of the direct current motor when the inverter first starts. It was found that without the condenser 60 in the circuit, the direct current motor would sometimes exceed the speed for which the tuned circuit, including the condenser 54 and the inductance 56, was designed to respond to before the relay 52 would have a chance to cut down the speed of the motor.

Since it is not only necessary to control the frequency of the current generated by the alternator but also to control the voltage generated in the alternator, a variable resistance 62 has been placed in series with the exciter field 14, as shown in the circuit diagram. The variable resistance 62 is controlled by a solenoid coil 64 arranged in the tuned circuit which includes the inductance 66, the condenser 68, and the variable inductance 70, all arranged in circuit as shown.

The inductance 70 has been made variable so as to compensate for manufacturing variations in the inverter and the control circuit. The mechanism for adjusting the variable inductance 70 will be described more fully hereinafter. A rectifier 72 has been provided in the circuit as shown, so as to supply direct current to the coil 64 for the purpose explained hereinabove in connection with the description of coil 52. Dash pots 65 and 67 have been provided for retarding the operation of the solenoids 52 and 64 respectively. The inductance 66 and the capacitance 68 are arranged in the circuit so as to be conscious of the voltage applied thereto and consequently it is obvious that the solenoid coil 64 may be used for effectively regulating the amount of resistance which the variable resistor 62 places in series with the field coil 14 for the purpose of controlling the voltage output of the alternator.

Figure 3:
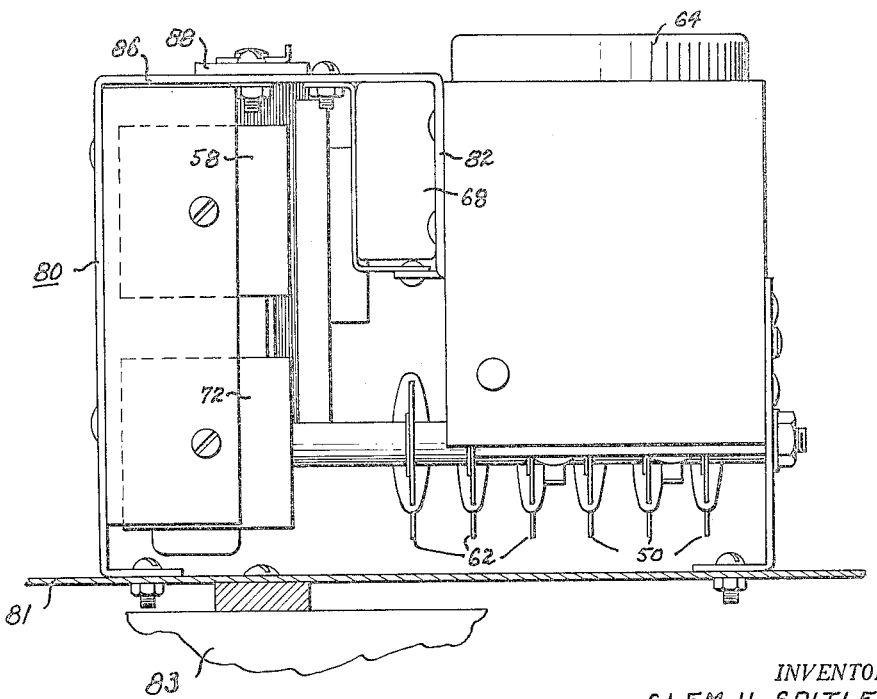
Figure 3 is an end elevational view of the control unit.

Referring now to Figures 2, 3, 4, and 5 of the drawings, reference numeral 80 designates a sheet metal frame which serves to support and protects the main regulator elements described hereinabove. As best shown in Figure 3, the frame 80 is bolted to a support 81 which in turn is bolted directly to the housing element 83 which is intended to represent the main inverter housing.

In order to provide compactness and yet render certain portions of the control mechanism accessible for adjustment and inspection purposes, the sheet metal frame 80 is open at the ends and is provided with a step or ledge portion 82 which serves to removably support the solenoids 52 and 64. The condenser 54 is arranged as shown, so as to be shielded and yet be accessible for inspection and replacement purposes.

The top surface 86 of the frame 80 serves to support a terminal block 88. The inductances 56 and 70 are mounted inside the frame 80, as shown, so as to be properly shielded and protected against damage.

As explained hereinabove, the inductance 56 includes means for varying the amount of iron in the flux path. As best shown in Figure 4 of the drawings, a stamped sheet metal bar or channel iron member 90 is pivotally supported at 92 adjacent the one side of the core of the inductance 56. An adjusting screw 94, which has its head accessible on the one side of the frame 80, has a threaded connection with the free end of the pivoted bar 90, so as to make it possible to adjust the distance between the metal bar 90 and the core of the inductance 56. It has been found that this simple expedient affords a very practical means for compensating for manufacturing variations and permits adjustment of frequency when in service.

The inductance 70 includes a shiftable iron core 96 which is threaded to the shank of the adjusting screw 98. The head of the screw 98 is also exposed at the one side of the frame 80 (see Figures 4, 5 and 6) so as to make it possible for one to adjust the inductance of the tuned circuit for controlling output voltage.

The construction and arrangement of the solenoids 52 and 64 is such that an increase in the current flowing through the same causes an increase in the amount of resistance placed in the control circuits by the resistances 50 and 62 respectively. Since the potential on the solenoid 52 is the greatest during the initial transient, the capacitor 60 acts as a shunt and absorbs some of the initial current surge so as to decrease flow of current through the solenoid 52. By virtue of this arrangement, the solenoid 52 does not serve to prematurely insert an excessive amount of resistance in series with the field coil 16.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In combination, a direct current motor having a field winding, an alternator having an exciter winding, a first resistance in series with said field winding, a second resistance in series with said exciter winding, first means including a solenoid responsive to the voltage output of said alternator for controlling the flow of current through said exciter winding, and second means responsive to the voltage output of said alternator for controlling the flow of current through said field winding, said first means comprising a tuned circuit including an inductance, said second means comprising an inductance and condenser paralleled across the output of the alternator through a rectifier and a control coil, and means for varying said inductance so as to compensate for manufacturing variations.

2. In combination, a direct current motor having a field winding, an alternator having an exciter winding, a first resistance in series with said field winding, a second resistance in series with said exciter winding, first means including a solenoid responsive to the voltage output of said alternator for controlling the flow of current through said exciter winding, and second means responsive to the voltage output of said alternator for controlling the flow of current through said field winding, said first means comprising a tuned circuit including an inductance, said second means comprising an inductance and condenser paralleled across the output of the alternator through a rectifier and a control coil, means for varying said inductance so as to compensate for manufacturing variations, and a condenser connected across said solenoid.

3. In combination, a motor, an alternator, means for drivingly connecting said alternator to said motor, means for varying the speed of said motor, said alternator having an exciter winding, a resistance in series with said exciter winding, and means responsive to the voltage output of said alternator for varying said resistance so as to control the flow of current through said exciter winding, said last named means comprising a tuned circuit including an inductance and a condenser connected in parallel across the output of said alternator through a second inductance and a control coil operable to vary said resistance, said second inductance comprising a variable inductance.

4. In combination, a motor, an alternator, means for drivingly connecting said alternator to said motor, means for varying the speed of said motor, said alternator having an exciter winding, a resistance in series with said exciter winding, means responsive to the voltage output of said alternator for varying said resistance so as to control the flow of current through said exciter winding, said last named means comprising a tuned circuit including an inductance and a condenser connected in parallel across the output of said alternator through a second inductance and a control coil operable to regulate said resistance, said inductance comprising a coil and a magnetic core having a stationary portion and a movable portion, and means for adjusting the movable portion relative to the stationary portion so as to vary the effectiveness of the core.

5. In combination, a dynamoelectric machine having a motor and an alternator operated by said motor, said motor having a series winding and a shunt winding, means responsive to the speed of said motor for rendering said series winding ineffective in response to a predetermined increase in the speed of said motor, said alternator having a stator winding and a rotating field winding, a first resistance in series with said shunt winding, a second resistance in series with said rotating field winding, a support for said first and second resistances comprising a one-piece stamped sheet metal casing element supported on said dynamoelectric machine, said casing element having oppositely disposed side wall portions, one of said side wall portions comprising a relatively flat panel and the other of said side wall portions having an offset intermediate the top and bottom thereof so as to form a horizontally disposed ledge, said first and second resistances being disposed beneath said ledge, first means responsive to the voltage output of said alternator for controlling the flow of current through said rotating field winding, said first means comprising a tuned circuit including a variable inductance and a condenser paralleled across the output of said stator winding through a control coil, said condenser and variable inductance being supported within said casing element and said control coil being removably supported on said ledge directly above said resistances, and means accessible through said first wall of said casing element for varying said inductance.

6. In combination, an inverter having a direct current motor and an alternator operated by said motor, said direct current motor having a series winding and a shunt winding, means responsive to the speed of said motor for rendering said series winding ineffective in response to a predetermined increase in the speed of said motor, said alternator having a stator winding and a rotating field winding, a first resistance in series with said shunt winding, a second resistance in series with said rotating field winding, a support for said first and second resistances comprising a one-piece stamped sheet metal casing element supported on said inverter, said casing element having oppositely disposed side wall portions, one of said side wall portions comprising a relatively flat panel and the other of said side wall portions having an offset intermediate the top and bottom thereof so as to form a horizontally disposed ledge, said first and second resistances being disposed beneath said ledge, first means responsive to the voltage output of said alternator for controlling the flow of current through said rotating field winding, said first means comprising a tuned circuit including a variable inductance and a condenser paralleled across the output of said stator winding through a control coil, said condenser and variable inductance being supported within said casing element and said control coil being supported on said ledge directly above said resistances, means accessible through said first wall of said casing element for varying said inductance, second means responsive to the voltage output of said alternator for controlling the flow of current through said rotating field winding, said second means comprising a tuned circuit including a variable inductance and a condenser paralleled across the output of said stator winding through a second control coil, said last named condenser and said last named variable inductance being supported within said casing element, and means accessible from the outside of said casing element for varying said last named variable inductance.

7. In a control for an inverter, a one-piece stamped sheet metal casing element, means for supporting said casing element on said inverter, said casing element having oppositely disposed side walls, one of said side walls comprising a relatively straight wall and the other of said side walls having an offset intermediate the top and bottom thereof so as to form a horizontally disposed ledge, a plurality of resistance elements supported beneath said ledge, and solenoid means for controlling said resistance elements, said solenoid means being removably mounted on said ledge, resonating means for controlling said solenoid means, said resonating means being mounted between said side walls, said resonating means including variable inductances and means projecting through one of said side walls for varying said inductances.

8. In combination, a direct current motor having a field winding, an alternator having an exciter winding, a first resistance in series with said field winding, means including a solenoid responsive to the voltage output of said alternator for controlling the flow of current through said field winding, said last named means comprising a tuned circuit including an inductance and a condenser paralleled across the output of said alternator through a rectifier and a control coil whereby rectified current generated by said alternator is used for operating said control coil, and means for varying said inductance.

9. In combination, a direct current motor having a field winding, an alternator having an exciter winding, a first resistance in series with said field winding, means including a solenoid responsive to the voltage output of said alternator for controlling the flow of current through said field winding, said last named means comprising a tuned circuit including an inductance and a condenser paralleled across the output of said alternator through a rectifier and a control coil whereby rectified current generated by said alternator is used for operating said control coil, and a condenser connected across said control coil and said rectifier.

10. In combination, a direct current motor having a field winding, an alternator having an exciter winding, a first resistance in series with said field winding, means including a solenoid responsive to the voltage output of said alternator for controlling the flow of current through said field winding, said last named means comprising a tuned circuit including an inductance and a condenser paralleled across the output of said alternator through a rectifier and a control coil whereby rectified current generated by said alternator is used for operating said control coil, a condenser connected across said control coil and said rectifier, and means for retarding the operation of the solenoid.

References Cited in the file of this patent

UNITED STATES PATENTS

| | | |
|---|---|---|
| 1,552,781 | Von Arco | Sept. 8, 1925 |
| 1,694,637 | Bethenod | Dec. 11, 1928 |
| 1,981,040 | Gulliksen | Nov. 20, 1934 |
| 2,001,557 | Von Ohlsen | May 14, 1935 |
| 2,284,649 | Grabau | June 2, 1942 |
| 2,492,513 | Allen | Dec. 27, 1949 |
| 2,507,488 | Buffington | May 16, 1950 |
| 2,521,639 | Lauricella et al. | Sept. 5, 1950 |
| 2,524,166 | Gartner | Oct. 3, 1950 |
| 2,529,766 | Gartner et al. | Nov. 14, 1950 |
| 2,531,727 | Emerson | Nov. 28, 1950 |

FOREIGN PATENTS

| | | |
|---|---|---|
| 404,917 | Great Britain | Apr. 18, 1932 |